US008537855B2

(12) United States Patent
Wieslawa

(10) Patent No.: US 8,537,855 B2
(45) Date of Patent: Sep. 17, 2013

(54) COORDINATION OF OPERATIONAL DATA OF BASE STATIONS IN A MULTIPROTOCOL ENVIRONMENT

(75) Inventor: Wajda Wieslawa, Keltern (DE)

(73) Assignee: Alcatel Lucent, Paris (FR)

( * ) Notice: Subject to any disclaimer, the term of this patent is extended or adjusted under 35 U.S.C. 154(b) by 170 days.

(21) Appl. No.: 13/031,813

(22) Filed: Feb. 22, 2011

(65) Prior Publication Data

US 2012/0214477 A1     Aug. 23, 2012

(51) Int. Cl.
*H04J 3/16*     (2006.01)
*H04J 1/16*     (2006.01)
*H04W 4/00*     (2009.01)

(52) U.S. Cl.
USPC ............... 370/466; 370/236.1; 370/236.2; 370/241.1; 455/432.2

(58) Field of Classification Search
USPC .......................................... 370/466
See application file for complete search history.

(56) References Cited

U.S. PATENT DOCUMENTS

2011/0096687 A1* 4/2011 Dottling et al. ............... 370/252

OTHER PUBLICATIONS

Blume et al., "Energy Savings in Mobile Networks Based on Adaptation to Traffic Statistics," Bell Labs Technical Journal 15(2), 77-94 (2010) © 2010 Alcatel-Lucent. Published by Wiley Periodicals, Inc. Published online in Wiley Online Library (wileyonlinelibrary.com).

* cited by examiner

*Primary Examiner* — Huy C Ho
(74) *Attorney, Agent, or Firm* — Duft, Bornsen & Fettig, LLP

(57) ABSTRACT

Systems and methods are disclosed for translating operational data between different protocols used by base stations to allow the base stations to coordinate their operational data. One embodiment is a system including a database, an interface, and a control system. The database stores translations between protocols used by base stations. The interface receives operational data in a first protocol from a first base station. The control system identifies a second base station as a target for the operational data, identifies a second protocol for the operational data used by the second base station, and identifies a translation stored in the database from the first protocol to the second protocol. The control system converts the operational data from the first protocol to the second protocol using the translation. The interface transmits the operational data in the second protocol to the second base station.

20 Claims, 3 Drawing Sheets

US 8,537,855 B2

COORDINATION OF OPERATIONAL DATA OF BASE STATIONS IN A MULTIPROTOCOL ENVIRONMENT

FIELD OF THE INVENTION

The invention is related to the field of communications and, in particular, to translating operational data of base stations encoded in different protocols to allow the base stations to coordinate their operational data with each other.

BACKGROUND

Mobile networks (also referred to as wireless or cellular networks) include a plurality of base stations that use radio signals to communicate with mobile devices, such as mobile phones. A base station controller interfaces with tens or hundreds of base stations, provides control over the base stations, and provides the mobile devices in range of the base stations access to a core network. For example, a base station controller may control the base stations by implementing the allocation of radio channels for the base stations and deciding how the mobile devices are handed off between the base stations.

Mobile network service providers have long desired a mobile network that is self-configuring, self-operating and self-organizing. For example, service providers desire base stations that automatically optimize their radio parameters (e.g., antenna tilt, power output, interference control, hand-off's, etc.), locate neighbors (peers that are geographically proximate to each other), compute their physical cell ID's, etc. The concept of Self-Organizing Networks (SON) was proposed in 3GPP, and some use cases were described in 3GPP TR 36.902. A new X2 interface between the base stations allows for a limited set of data to be exchanged between the base stations using the X2 Application Protocol (X2AP, described in 3GPP TS 36.423).

One disadvantage of X2AP is that it lacks specialized support for exchanging vendor specific operational data between base stations. Because X2AP is a standard, it generally implements only the most basic of data exchanges between base stations. Typically, a base station vendor attempts to differentiate over its competitors by implementing proprietary protocols between its base stations and the base station controller to allow the vendor to support specialized operational data exchanges between their base stations via the base station controller. For example, the proprietary protocol may support new SON functions that arise due to the development and implementation of new ideas, which are not supported in a standardized protocol such as X2AP.

When a mobile network is deployed with base stations supplied by different vendors, a mixture of proprietary protocols used by the base stations when communicating with the base station controller may hinder the ability of the base stations to coordinate with each other effectively. This reduces the effectiveness of mobile network in a multi-protocol base station environment.

SUMMARY

Embodiments described herein provide for translating operational data between different protocols used by base stations to allow the base stations to coordinate their operational data with each other. Typical mobile networks include a plurality of base stations supplied by multiple vendors. Many base station vendors implement proprietary protocols to a base station controller to allow their base stations to support specialized operational data exchanges between the base stations. For example, neighboring base stations may wish to exchange radio interference information so that each base station may coordinate with its neighbors to reduce interference between the base stations and to improve the performance of the mobile network. This type of coordination may be hindered when the base stations support different protocols, such as when the base stations are provided by different vendors. In the embodiments described herein, translations are used to convert operational data between different protocols used by the base stations. This allows the base stations to coordinate their operational data with each other more effectively.

One embodiment comprises a system coupled with a plurality of base stations of a mobile network. The system includes a database, an interface, and a control system. The database stores translations between protocols used by the base stations. The interface receives operational data in a first protocol from a first base station. The control system identifies a second base station as a target for the operational data, identifies a second protocol for the operational data used by the second base station, and identifies a translation stored in the database from the first protocol to the second protocol. The control system converts the operational data from the first protocol to the second protocol using the translation. The interface transmits the operational data in the second protocol to the second base station to allow the second base station to coordinate its operational data with the first base station.

Another embodiment comprises a system coupled with a plurality of enhanced Node B (eNB) base stations of a mobile network. In this embodiment, the eNBs communicate with each other over X2AP. The system includes a controller. The controller stores translations between protocols used by the eNBs. The controller receives operational data in a first protocol from a first eNB, where the first protocol includes an enhanced set of operational data as compared to X2AP. The controller identifies a second eNB as a target for the operational data, identifies a second protocol for the operational data used by the second eNB, and identifies a translation stored in the database from the first protocol to the second protocol. The controller converts the operational data from the first protocol to the second protocol using the translation. The controller transmits the operational data in the second protocol to the second eNB to allow the second eNB to perform a Self-Organizing Network (SON) activity with the first eNB.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
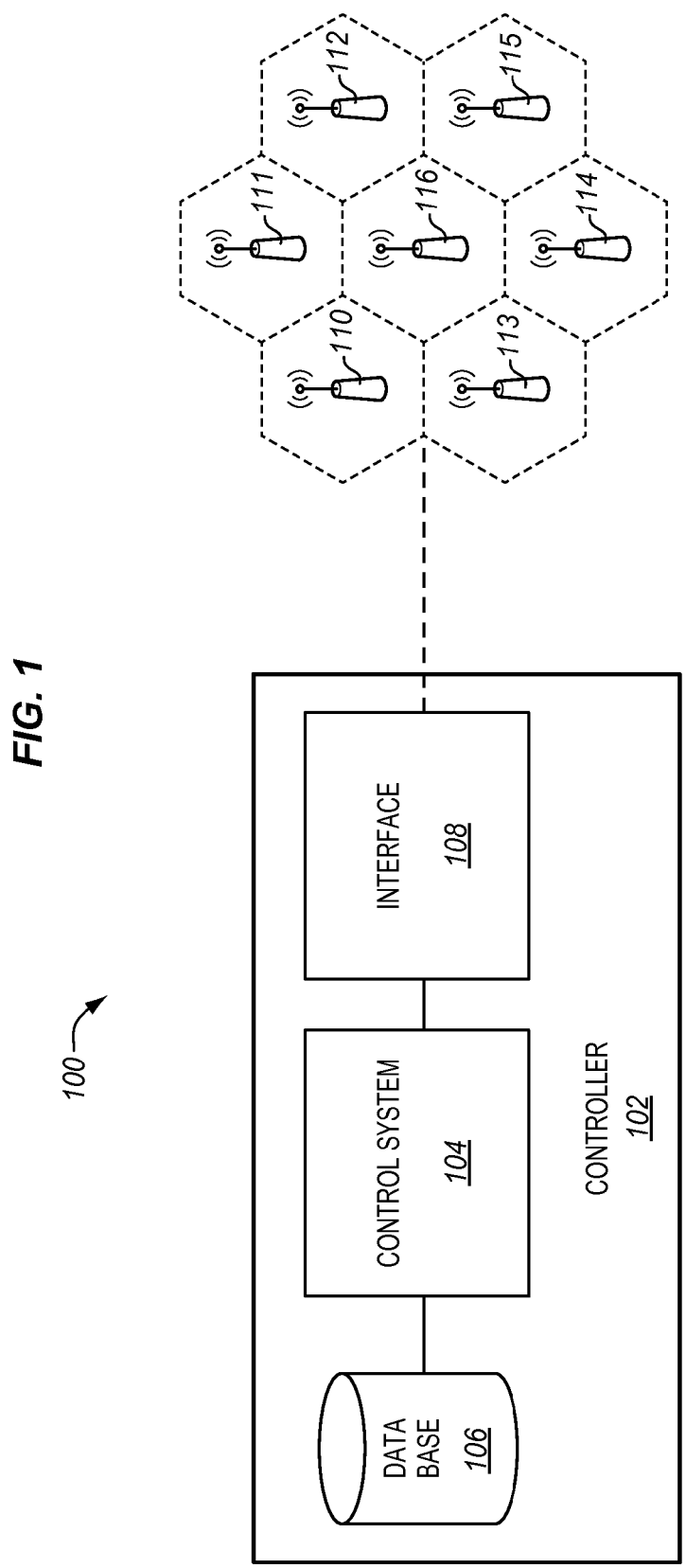
FIG. 1 illustrates a mobile network in an exemplary embodiment.

FIG. 1 illustrates a mobile network 100 in an exemplary embodiment. Mobile network 100 may be a LTE network or some other type of packet-switched wireless network. Mobile network 100 includes a controller 102 coupled with a plurality of base stations 110-116. Controller 102 interfaces with base stations 110-116, provides control over the base stations 110-116, and also provides mobile devices in range of base stations 110-116 (e.g., within cells indicated by dashed lines around each of base stations 110-116) access to a core network. For example, controller 102 may be part of a base station controller that implements the allocation of radio channels for base stations 110-116 and decides how the mobile devices are handed off between base stations 110-116. An interface 108 comprises any system, device, or component that is operable to communicate with base stations 110-116 with a variety of protocols used by base stations 110-116. In this embodiment, one or more of base stations 110-116 use different protocols defined by different vendors. For example, base station 110 and base station 113 may be supplied by different vendors that use different protocols for their operational data. Controller 102 also includes a database 106 that stores translations between protocols used by base stations 110-116. A control system 104 of controller 102 comprises any system, device or component that is operable to identify translations stored in database 106 between protocols used by base stations 110-116, and to convert the operational data for base stations 110-116 between the different protocols. This allows base stations 110-116 to coordinate their operational data with each other regardless of the protocols used for the operational data. How controller 102 operates will be discussed in more detail with regard to FIG. 2.

Figure 2:
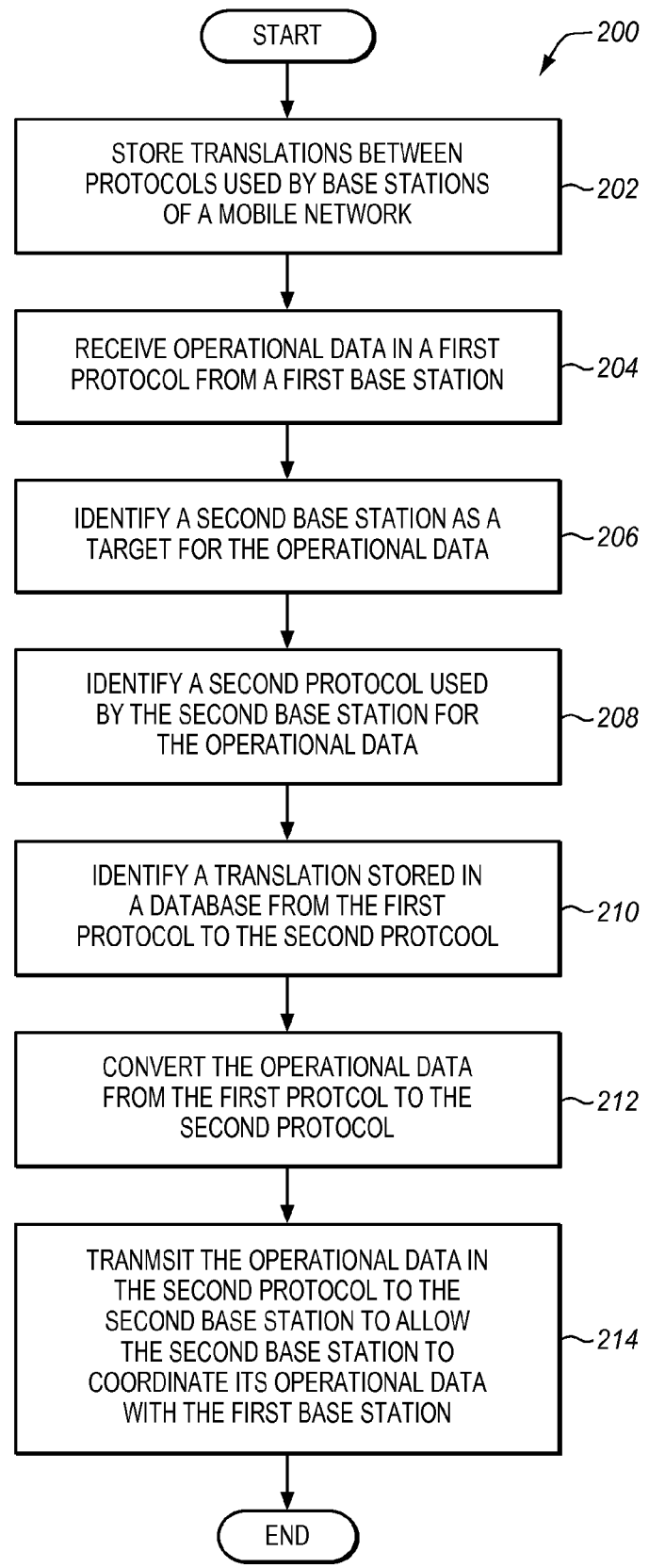
FIG. 2 is a flow chart illustrating a method of translating messages between protocols used by base stations in an exemplary embodiment.

FIG. 2 is a flow chart illustrating a method of translating operational data between protocols used by base stations 110-116 in an exemplary embodiment. The steps of method 200 will be described with respect to controller 102 of FIG. 1, although one skilled in the art will understand that method 200 may be performed by other systems not shown. The steps of the methods described herein are not all inclusive and may include other steps not shown. The steps may also be performed in an alternative order.

In step 202, database 106 (see FIG. 1) stores translations between protocols used by base stations 110-116. For example, database 106 may store a translation between one protocol used by base station 110 for operational data and another protocol used by base station 113 for operational data. The protocols used by base station 110 and base station 113 may each be different proprietary protocols defined by different vendors for base station 110 and base station 113. Operational data for base stations 110-116 pertains to the operation, administration, maintenance, and provisioning of base stations 110-116. For example, operational data for base station 110 may include the transmit power for base station 110, hand-off parameters used when transferring mobile devices between base station 110 and other base stations 111-116, radio interference detected at base station 110, an antenna tilt at base station 110, etc.

In step 204, interface 108 receives operational data in a first protocol from one of base stations 110-116. For example, interface 108 may receive operational data for base station 110 in a first protocol such as radio parameter information for base station 110. Radio parameter information for base station 110 may be useful to other base stations 111-116 to optimize the wireless performance of mobile network 100.

In step 206, control system 104 identifies one or more base stations 110-116 as a target for the operational data. When identifying a target for the operational data, control system 104 may process the operational data to determine the type of data, the context of the data, etc. For example, if the operational data includes radio interference detected at base station 110, then control system may determine that base stations 111, 113, and 116 are geographical neighbors to base station 110 and therefore, that the operational data is relevant to base stations 111, 113, and 116.

In step 208, control system 104 identifies a second protocol used by one or more base stations 110-116 determined to be the target in step 206. In this embodiment, the second protocol is different than the first protocol. This may occur when one or more base stations 110-116 are from different vendors and utilize different vendor-defined proprietary protocols. Base station vendors may define their own proprietary protocols to support new types of operational data and network management functionality. For example, a proprietary protocol may support new Self-Organized Network (SON) data and functionality that arises due to the development and implementation of new ideas, which are not supported in a standardized protocol.

When identifying the second protocol, control system 104 may attempt to do so in a number of ways. Control system 104 may analyze the operational data to identify specific headers or formats, may compare protocol templates stored in database 106 with the operational data, etc. Control system 104 may also query database 106 to determine the second protocol based on the one or more base stations 110-116 determined to be the target. Database 106 may store a table of protocols in use by base stations 110-116, and may be able to provide the protocol information to control system 104 upon request. Control system 104 may also determine vendor information for the one or more base stations 110-116, and query database 104 with the vendor information to determine the second protocol in use by the one or more base stations 110-116. When a plurality of base stations 110-116 are targets for the operational data, then control system may identify a plurality of second protocols that correspond to each of the base stations 110-116 identified as a target. In some cases, base stations 110-116 may utilize a variety of protocols for encoding operational data for base stations 110-116.

In step 210, control system 104 identifies a translation stored in database 106 from the first protocol to the second protocol. In step 212, control system 104 converts the operational data from the first protocol to the second protocol using the translation identified in step 210. When converting the operational data between the protocols, control system 104 may first determine how each of the protocols encodes the operational data. For example, the translation identified in step 210 may indicate how the protocols each encode a specific type of operational data in different data frames or a position within a frame of data. This allows control system 104 to use the translation as a guide to first locate the operational data in a frame of data encoded in the first protocol. The control system may then map the operational data to a location within a frame of date encoded in the second protocol.

In some cases, there might not be a one-to-one mapping of operational data between the first protocol and the second protocol. In this case, control system 104 may convert the operational data in the first protocol to a set of operational data for encoding in the second protocol. For example, the first protocol may encode both a transmit power and an antenna tilt for one of base stations 110-116 in a single location within of a frame of data. In the example, the second protocol may encode transmit power and antenna tilt in two different locations within a frame of data. Thus, control system 104 may process the operational data in the first protocol to generate the transmit power operational data and the antenna tilt operational data as separate elements of operational data, and then encode the transmit power and the antenna tilt into different locations within a frame of data encoded in the second protocol.

In other cases, control system 104 may convert the operational data in the first protocol before mapping the operational data to the second protocol. For example, the first protocol may represent transmit power for one of base stations 110-116 as an actual power in watts, while the second protocol may represent transmit power for one of base stations 110-116 as an effective radiated power. Thus, control system 104 may convert the actual power in watts to an effective radiated power before mapping the operational data from the first protocol to the second protocol.

In step 214, interface 108 transmits the operational data in the second protocol to one or more of base stations 110-116 determined as the target for the operational data. In continuing with the example where interface 108 receives operational data from base station 110, if base station 113 is identified as the target in step 206, then interface 108 transmits the operational data in the second protocol to base station 113. This allows base station 113 to coordinate its operational data with base station 110 regardless of the protocols used to encode their respective operational data, which improves the performance of mobile network 100.

In the example, base station 110 sends an enhanced set of operational data as compared to a standardized protocol. In some embodiments, the standardized protocol may be X2AP. X2AP, described in 3GPP TS 36.423, is a protocol used to coordinate activity between base stations (via an X2 interface). Because X2AP is a standard, it lacks specialized support for vendor specific operational data. When control system 104 translates operational data between protocols that are enhanced as compared to a standardized protocol, base stations 110-116 coordinate their activities with each other more efficiently. Translating the enhance protocols also allows vendors to implement new ideas and concepts for how base stations 110-116 coordinate their activities with each other, such as allowing base stations 110-116 to perform new SON functions. Controller 102 therefore allows for this enhanced functionality and data exchanges to occur between base stations 110-116 even though the protocols used by base stations 110-116 are different.

Some examples of data and functions that may be exchanged are:
Register request (cellID, parameter list, periodicity)
Short description: base station 1 registers a request by base station 2 for parameter exchange. Base station 2 will decide if it will exchange the parameters or not. The parameters could be: measurements, counters, KPIs (Key Performance Indicators) where the periodicity could be: periodically, on request, threshold min., threshold max.
Example: register ([CellID, KPI HO failure rate, periodically 5 s], [CellID, cell capacity, On request])
Register Request ACK {([cell, parameter, periodicity])}
Short description: base station 2 agrees to parameter exchange with base station 1. Note: not all requested parameters have to be agreed.
Register Request NACK Short description: base station 2 does not agree to parameter exchange with base station 1.
Synchronisation token (cell, parameter)
Short description: in cases of timely synchronization of defined parameters between neighbor's base stations, a master base station sends a synchronization token.
The parameters could be, for example, setting (changing) at the same time of radio parameters, e.g. antenna tilt, frequency pattern.
Other exemplary functions:
Notifications, e.g., a number of connected mobile users in neighbour cells, their position and speed. Such information may be used when implementing energy saving functions and to make decisions regarding switching a base station on/of, a capacity reduction, etc.
Messages for base station cooperating in multi RAT environment, e.g., switching a dual-RAT base station to other radio technology.
Messages for network management, e.g., converting sectorized antenna configurations to omni antenna configurations.

Figure 3:
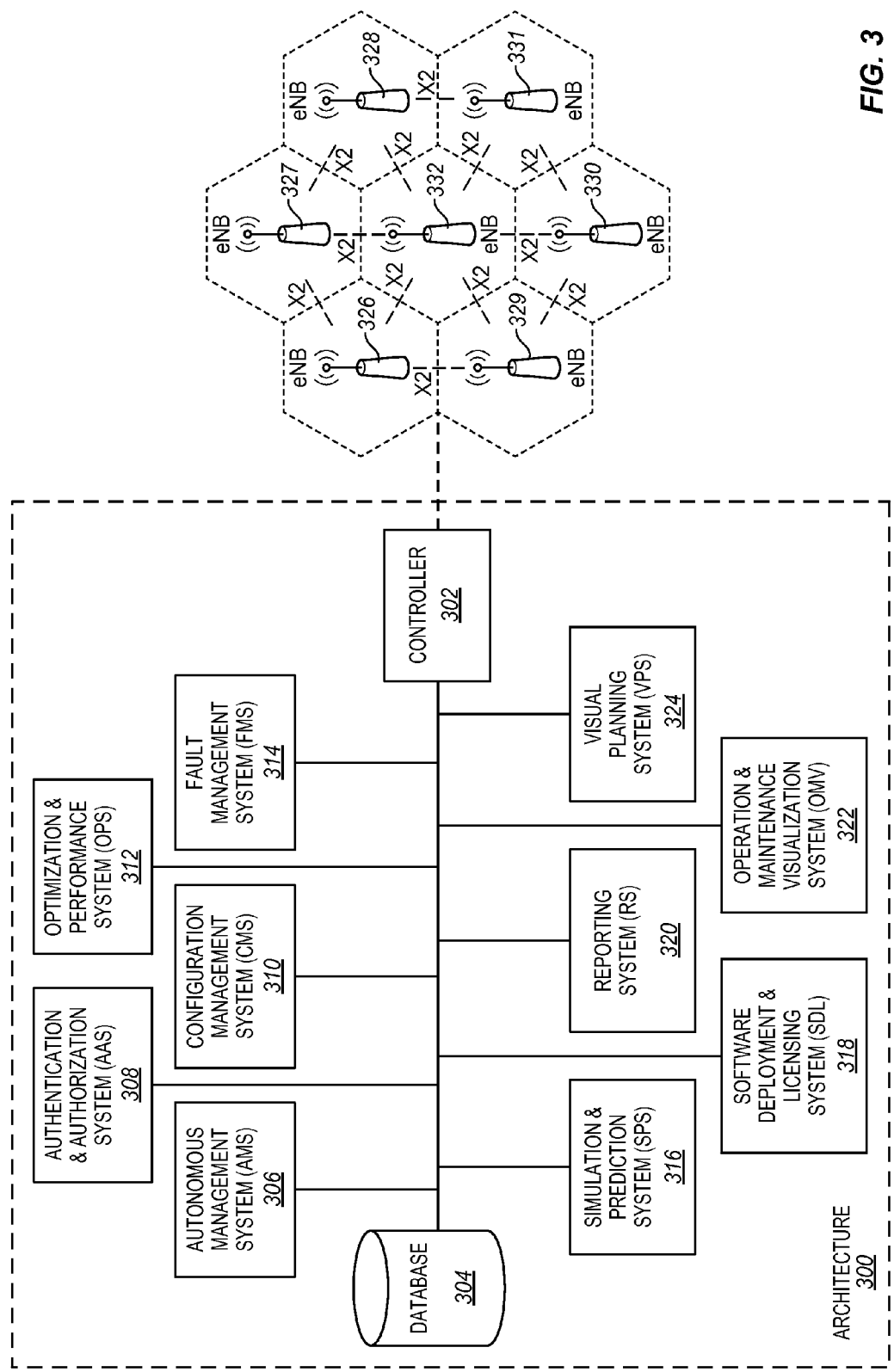
FIG. 3 illustrates a Self-Organizing Network (SON) architecture in an exemplary embodiment.

FIG. 3 illustrates a network management and SON architecture 300 in an exemplary embodiment. Architecture 300 communicates with a plurality of enhanced NodeB base stations (eNBs) 326-332 to provide network management functions, network autonomy, and self-organization to eNBs 326-332. In this embodiment, eNBs communicate with each other over the X2 interface using X2AP.

Architecture 300 may be part of the EPC of an LTE network, and therefore, may be used to augment the typical functionality found in network elements of the LTE network. Architecture 300 includes controller 302. Controller 302 interfaces with eNBs 326-332, provides control over eNBs 326-332, and provides mobile devices in range of eNBs 326-332 access to a core network. In this embodiment, controller 302 receives operational data from one or more eNBs 326-332 in a first protocol that includes an enhanced set of operational data as compared to X2AP. Controller 302 then translates the operational data into a second protocol. In like manner to the first protocol, the second protocol includes an enhanced set of operational data as compared to X2AP. Controller 302 transmits the operational data in the second protocol to one or more eNBs 326-332 to allow eNBs 326-332 to perform a SON activity with each other.

For example, controller 302 may receive operational data from eNB 326 in protocol A defined by vendor A of eNB 326. In the example, controller 302 identifies eNB 329 as a target for the operational data, and identifies protocol B defined by vendor B of eNB 329. In the example, protocol A and protocol B are different. More particularly, protocol A and protocol B are defined by their respective vendors (i.e., vendor A and vendor B), and include enhanced operational data as compared to X2AP. Controller 302 identifies a translation between protocol A and protocol B, and translates operational data from protocol A to protocol B using the translation. Controller 302 then transmits the operational data in protocol B to eNB 329. This allows eNB 329 to perform SON activity with eNB 326.

Architecture 300 further includes a number of additional systems 306-324, and a database 304. Database 304 stores network data and it supports data retrieval and maintenance for systems 306-324. Database 304 includes templates, operator preferences and policies for architecture 300. The data of database 304 is accessible for algorithms performed by eNBs 326-332 as well as for monitoring and control of architecture 300. Some example data elements that may be managed by database 304 are a master database, an operational database, an inventory database, and a data log database.

The master database includes general information for architecture 300 that can be used in terms of templates either for initialisation purposes or for resetting of configuration parameter after a re-start if the configuration data for eNBs 326-332 are corrupted. The master database stores "best practice" values generated from static and live data of the network in appropriate templates. The static parameters are based on planning data and including operator preferences and input from eNB vendors. Furthermore, the master database may be updated with live data after architecture 300 reaches a stable state. This data may be adopted as initial values for architecture 300, and also may be used for development purposes.

During operation of architecture 300, the operational database may be created by database 304. The operational database is updated after optimization processes, such as when eNBs 326-332 update their radio parameters. The operational database stores current data for architecture 300 including performance counters and Key Performance Indicators (KPIs) for eNBs 326-332.

The inventory database stores the hardware and software configuration of eNBs 326-332. When a new eNB is detected by architecture 300, the new eNB compares its hardware and software information with the data stored in the inventory database. If the data is different, then a warning may be generated to a network operator.

The data log database includes data about actions performed by architecture 300. Various changes to the parameters of architecture 300 may be stored in the data log database to allow the network operator to track how architecture 300 changes over time.

An Autonomous Management System (AMS) 306 (see FIG. 3) is responsible for automating some of the tasks and management functions normally performed by a network operator. AMS 306 may allow for architecture 300 to be nearly autonomous by communicating with and coordinating with the other systems 308-324 of architecture 300 that support self-sufficiency and implement "best practice" network planning. AMS 306 provides the network operator the option to control the level of autonomous operation of architecture 300 and allows the network operator to stop any automation and change to a manual mode for network management.

An Authentication and Authorization System (AAS) 308 is responsible for tasks related to eNBs 326-332 authentication and authorization, network operator authentication, and authorization of software entities to perform actions within architecture 300. AAS 308 allows for the control of SON functions and algorithms for authenticated network operators, and allows for online access to performance and network management data to authorized entities.

A Configuration Management System (CMS) 310 is responsible for the start-up of architecture 300, initialization at start-up, a restart after a hardware/software reset, and reboot after a software update to architecture 300. It includes procedures and operations that range from bootstrap operations to the set-up of eNBs 326-332 into an operational mode.

Bootstrap is a simple program that begins of the initialization and activation of operation system of a base station after the base station is switched on. Bootstrap operations consists of the testing background hardware as CPU, memory and few other components belonging to the core system to assure fault free bootstrap and operation of the OS kernel.

Some of the tasks performed by CMS 310 include hardware identification, test and setup, radio parameter configuration, revision of software and hardware configurations of base stations 326-332, including software updates to eNBs 326-332. CMS 310 may also perform tasks for investigation of neighbor relations, setup of communication protocols over S1 and X2 interfaces, and reporting on the setup process.

CMS 310 performs configuration of radio parameters if configuration data in database 304 is not available. In the case of a new deployed eNB, a self-configuration process for configuration parameters are deduced from similar configured eNBs based on parameter generalization, calculation of distance metric, parameter weighting, etc. Additional information includes, antenna tilt, antenna beam-width, antenna pointing direction, etc.

Coordination with neighboring eNBs has the aim of informing neighbor eNBs about the time a new eNB will switch on, and to coordinate the changeover of radio and other parameters between old and new values. This may occur when a new eNB is placed in the field and it configures itself with help of intelligent algorithms, or an eNB starts after reset. For example, in the latter case, the presence of new parameters for neighbor eNBs may be checked.

An Optimization and Performance System (OPS) 312 improves the performance and stability of architecture 300 using a set of intelligent algorithms. OPS 312 is responsible for the management and collection of performance measurement data, and performance optimization across the wireless network. OPS 312 also calculates and analyses KPIs for eNBs 326-332.

A Fault Management System (FMS) 314 manages tasks related to the discovery of faults in architecture 300, recovery after faults, fault interpretation and reporting. It also includes fault recognition and a prediction system to recognize abnormal situations in architecture 300 and provide an early warning of impending faults. Some faults may be located by analyzing the data logs stored in database 304 to look for data dependencies or patterns in the log data.

A Simulation and Prediction System (SPS) 316 is responsible for the simulation and prediction of the behavior of architecture 300 through the use of defined stimuli. SPS 316 allows for the simulation of installing new eNBs, and for the evaluation of possible operational changes to architecture 300 that may affect the performance of eNBs 326-332.

A Software Deployment and Licensing system (SDL) 318 supports software deployment across architecture 300 and implements the management of software versions, the management and control of software licenses, and tracks the software update history for architecture 300. SDL 318 may also allow control over how software updates are performed on architecture 300. For example, systems 306-316 and 320-324 may wait for update triggers from SDL 318 or may periodically query SDL 318 to check if new software updates are available.

A Reporting System (RS) 320 manages tasks related to reporting for architecture 300. RS 320 is a collection of templates and reporting routines for reporting on the state, efficiency, and history of architecture 300. A library of report templates may be used by a network operator as well as other systems 306-318 and 322-324 when generating reports.

An Operation and Maintenance Visualization system (OMV) 322 provides a user interface for the operation and management of architecture 300. OMV 322 may allow a network operator preferences and policies for the operation of architecture 300.

A Visual Planning System (VPS) 324 manages tasks for system planning for architecture 300 using a visual user interface. VPS 324 includes planning of general parameters for architecture 300, radio planning for eNBs 326-332, setup of a security and authentication policy for architecture 300, operator network design, and the approval and registration of new components for architecture 300.

Planning general parameters includes site planning, setting of eNBs 326-332 ID's, etc. Radio planning includes management eNBs 326-332 cell frequencies, cell identifiers, antenna tilt, cell RF parameters, hand off parameters, physical channel parameters, etc. VPS 324 provides wizards, templates, checking rules, knowledge bases, and a set of visual simulation and prediction tools based on services provided by SPS 316.

Setup of a security and authentication policy for architecture 300 allows AAS 308 to manage the access of network operators and systems 306-322 to the resources of architecture 300. This ensures a comprehensive security policy for architecture 300. Operator network design includes capacity planning, setup of parameters for DHCP and DNS servers, and router setup to allow architecture 300 to communicate with MMEs in the EPC.

The approval and registration of new components for architecture 300 includes creating information for new eNBs in AAS 308. Typically, this is performed manually by the network operator to ensure that eNBs are not added without knowledge of the network operator. AAS 308 may reject authentication and authorization attempts for eNBs that are unknown to architecture 300.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are functional when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

I claim:

1. A system coupled with a plurality of base stations of a mobile network, the system comprising:
a database operable to store translations between protocols used by the base stations;
an interface operable to receive operational data in a first protocol from a first base station; and
a control system operable to identify a second base station as a target for the operational data, to identify a second protocol for the operational data used by the second base station, to identify a translation stored in the database from the first protocol to the second protocol, and to convert the operational data from the first protocol to the second protocol using the translation,
the interface is further operable to transmit the operational data in the second protocol to the second base station to allow the second base station to coordinate its operational data with the first base station.

2. The system of claim 1 wherein:
at least one of the first protocol and the second protocol includes an enhanced set of operational data as compared to X2AP.

3. The system of claim 1 wherein:
the operational data in the second protocol allows the second base station to perform a Self-Organized Network (SON) activity with the first base station.

4. The system of claim 1 wherein:
the operational data from the first base station comprises at least one of a handover parameter used when transferring User Equipment (UE) between base stations, an antenna tilt of the first base station, and a radio power output of the first base station.

5. The system of claim 1 wherein:
the first base station and the second base station are located proximate to each other geographically.

6. The system of claim 1 wherein:
the control system is further operable to identify other base stations as targets for the operational data, to identify a plurality of protocols each corresponding with one of the other base stations for the operational data, and to convert the operational data from the first protocol to each of the plurality of protocols,
the interface is further operable to transmit the operational data in each of the plurality of protocols to the corresponding one of the other base stations to allow the other base stations to coordinate their operational data with the first base station.

7. The system of claim 1 wherein:
the control system is further operable to identify the second protocol for communicating the operational data to the second base station based on a type of information included in the operational data.

8. The system of claim 1 wherein:
the control system is further operable to identify the second protocol for the operational data used by the second base station based on a vendor of the second base station.

9. The system of claim 1 wherein:
at least one of the first protocol and the second protocol include an enhanced set of Self-Organized Network (SON) functions as compared to X2AP.

10. A method comprising:
storing translations between protocols used by base stations of a mobile network in a database;
receiving operational data in a first protocol from a first base station;
identifying a second base station as a target for the operational data;
identifying a second protocol for the operational data used by the second base station;
identifying a translation stored in the database from the first protocol to the second protocol;
converting the operational data from the first protocol to the second protocol using the translation; and transmitting the operational data in the second protocol to the second base station to allow the second base station to coordinate its operational data with the first base station.

11. The method of claim 10 wherein:
at least one of the first protocol and the second protocol includes an enhanced set of operational data as compared to X2AP.

12. The method of claim 10 wherein:
the operational data in the second protocol allows the second base station to perform a Self-Organized Network (SON) activity with the first base station.

13. The method of claim 10 wherein:
the operational data from the first base station comprises at least one of a handover parameter used when transferring User Equipment (UE) between base stations, an antenna tilt of the first base station, and a radio power output of the first base station.

14. The method of claim 10 wherein:
the first base station and the second base station are located proximate to each other geographically.

15. The method of claim 10 further comprising:
identifying other base stations as targets for the operational data;
identifying a plurality of protocols each corresponding with one of the other base stations for the operational data;
converting the operational data from the first protocol to each of the plurality of protocols; and
transmitting the operational data in each of the plurality of protocols to the corresponding one of the other base stations to allow the other base stations to coordinate their operational data with the first base station.

16. The method of claim 10 wherein identifying the second protocol further comprises:
determining a type of information included in the operational data; and
identifying the second protocol based on the type of information.

17. The method of claim 10 wherein identifying the second protocol further comprises:
determining a vendor for the second base station; and
identifying the second protocol based on the vendor.

18. The method of claim 10 wherein:
at least one of the first protocol and the second protocol include an enhanced set of Self-Organizing Network (SON) functions as compared to X2AP.

19. A system coupled with a plurality of enhanced Node B (eNB) base stations of a mobile network, wherein the eNBs communicate with each other over X2AP, the system comprising:
a controller operable to store translations between protocols used by the eNBs;
the controller further operable to receive operational data in a first protocol from a first eNB, wherein the first protocol includes an enhanced set of operational data as compared to X2AP;
the controller further operable to identify a second eNB as a target for the operational data, to identify a second protocol for the operational data used by the second eNB, to identify a translation stored in the database from the first protocol to the second protocol, and to convert the operational data from the first protocol to the second protocol using the translation,
the controller further operable to transmit the operational data in the second protocol to the second eNB to allow the second eNB to perform a Self-Organized Network (SON) activity with the first eNB.

20. The system of claim 19 wherein:
the first protocol is defined by a first vendor of the first eNB, the second protocol is defined by a second vendor of the second eNB, and the first vendor and the second vendor are different vendors.

* * * * *